United States Patent [19]

Toba

[11] Patent Number: 4,488,185
[45] Date of Patent: Dec. 11, 1984

[54] ASSEMBLE EDITING SYSTEM FOR VIDEO TAPE RECORDER

[75] Inventor: Akira Toba, Yokohama, Japan

[73] Assignee: Tokyo Shibaura Denki Kabushiki Kaisha, Kawasaki, Japan

[21] Appl. No.: 400,404

[22] Filed: Jul. 21, 1982

[30] Foreign Application Priority Data

Jul. 22, 1981 [JP] Japan ................................. 56-114709

[51] Int. Cl.³ ...................... H04N 5/782; G11B 27/02
[52] U.S. Cl. ................................................. 360/14.1
[58] Field of Search ................... 360/14.1, 14.2, 14.3, 360/33.1, 70; 358/311

[56] References Cited

U.S. PATENT DOCUMENTS

| 3,974,522 | 8/1976 | Fukatsu et al. | 360/14.2 |
|---|---|---|---|
| 4,163,262 | 7/1979 | Kaemmerer | 360/14.1 |
| 4,163,263 | 7/1979 | Rotter | 360/14.1 |
| 4,280,149 | 7/1981 | Bragas | 360/14.1 |
| 4,358,797 | 11/1982 | Nishijima et al. | 360/14.2 |
| 4,389,680 | 6/1983 | Gramling | 360/14.1 |
| 4,390,908 | 6/1983 | Nakamura et al. | 360/14.2 |

Primary Examiner—Donald E. McElheny, Jr.
Attorney, Agent, or Firm—Cushman, Darby & Cushman

[57] ABSTRACT

An assemble editing system for a video tape recorder having first and second video heads disposed on a rotary disc at an interval of 180°. A sub-head is disposed on the rotary disc at predetermined intervals with respect to the first and second video heads. In response to a recording pause operation, the supply of a video signal to the video heads is interrupted after a video track has been recorded on a magnetic tape by the first head, and thereafter the magnetic tape is rewound for a given time interval. Subsequently, the recording pause operation is released and the magnetic tape is driven in the forward direction. The output signal level of the sub-head which traces the video tracks recorded by the first and second video heads is examined. When the first video head traces the final video track formed thereby, the output signal level of the sub-head is lowered. In response to this, the supply of the video signal to the video heads is restarted at a timing that the first head completes to trace the final video track. A new video track is recorded by the second video head which is adjacent to the final video track recorded by the first video head. One of the special playback heads for slow and still reproduction can be used as the sub-head for assemble editing.

5 Claims, 7 Drawing Figures

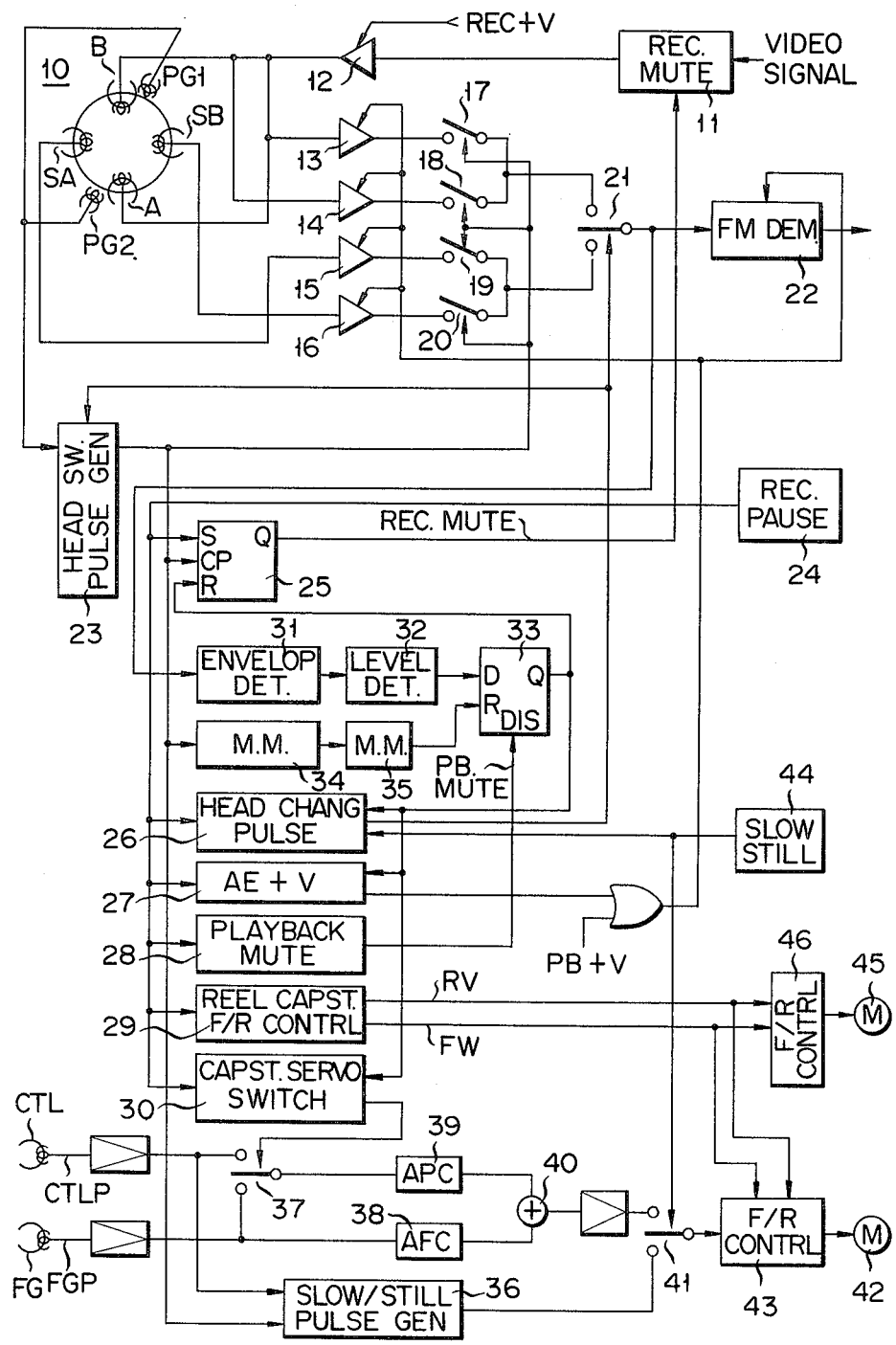

ASSEMBLE EDITING SYSTEM FOR VIDEO TAPE RECORDER

BACKGROUND OF THE INVENTION

The present invention relates to a video tape recorder and, more particularly, to an assemble editing or continuous recording system for a video tape recorder.

With a home video, in order to perform an assemble editing, or a new video recording continuous with the previous video recording, a video tape is rewound from the end of the previous video recording for a given time interval and then an operation is brought to a playback mode for a predetermined time interval. During the predetermined time interval of playback mode, the previous video recording pattern and the new video recording pattern are phased, and the new video signal is then recorded on the tape. In this case, the rewinding amount of tape generally differs from the take-up amount of tape in the playback mode during which a capstan servo system is operated and stabilized. In general, the rewinding amount of tape is set greater than the take-up amount of tape. Accordingly, the new video signal overlaps the previously recorded video signal. With the above recording system, the rewinding amount of tape is small, thus providing a better picture reproduction than another recording system in which a blank portion is formed between the previous recording pattern and the new recording pattern. At the overlapping portion, the previously recorded video signal is substantially erased, while part of it remains. Therefore, the overlapping portion generates unpleasant beats in playback. In order to perform an assemble editing without the formation of overlapping portion, a rotary erase head may be disposed in the proximity of a video head. However, this is not economical.

SUMMARY OF THE INVENTION

It is, therefore, an object of the present invention to provide an assemble editing system of a video tape recorder and a method therefore, wherein a new video recording pattern is formed continuously with a previous video recording pattern without forming a blank portion or an overlapping portion therebetween.

According to an aspect of this invention there is provided an assembly editing system for a video tape recorder which has first and second video heads disposed on a rotary disc at an interval of 180° for sequentially recording a video signal for each field as a single skewed video track on a magnetic tape and for sequentially reproducing therefrom the video signal for each field, comprising: a sub-head disposed on the rotary disc at predetermined intervals with respect to the first and second video heads; recording pause means responsive to a recording pause operation given by an operator during a recording mode for generating a recording pause signal until the recording pause operation is released; recording mute means responsive to the recording pause signal for interrupting the supply of the video signal to the first and second video heads at a timing that a video recording by the first video head is completed; means for rewinding the magnetic tape for a given time interval in response to the recording pause signal; means for running the magnetic tape in the forward direction in response to a recording pause release operation given after the magnetic tape has been rewound for the given time interval; final track detecting means for detecting, after the start of running of the magnetic tape in the forward direction, the final track of a previous recording pattern that is recorded on the magnetic tape by the first video head in accordance with the level of a reproduced output signal of the sub-head which traces video tracks recorded during the recording mode; and recording mute releasing means responsive to detection of the final track of the previous recording pattern for causing the recording mute means to restart the supply of video signal to the first and second video heads at a timing that a new video track is started to be recorded by the second video head which is adjacent to the final video track recorded by the first video head.

According to another aspect of this invention there is provided an assemble editing method for a video tape recorder which comprises first and second video heads disposed on a rotary disc at an interval of 180° for sequentially recording a video signal for each field as a single skewed video track on a magnetic tape and for sequentially reproducing therefrom the video signal for each field, and a sub-head disposed on the rotary disc at predetermined intervals with respect to the first and second video heads, comprising the steps of: operating the video tape recorder in a recording mode to sequentially record video tracks on the magnetic tape by the first and second video heads; performing a recording pause operation; interrupting the supply of the video signal to the first and second video heads at a timing that the first video head completes to record a video track after the recording pause operation; rewinding the magnetic tape for a given time interval after the supply of the video signal to the first and second video heads is interrupted; running the magnetic tape in the forward direction by releasing the recording pause operation after the magnetic tape has been rewound for the given time interval; detecting the level of an output signal of the sub-head tracing the video tracks recorded by the first and second video heads in the first step after the magnetic tape is started to run in the forward direction; and restarting, in response to the reduction of the level of the output signal of the subhead, the supply of the video signal to the first and second video heads at a timing that the first video head completes to trace the final video track recorded by the first video head in the fist step.

BRIEF DESCRIPTION OF THE DRAWINGS

FIG. 3 is a block diagram of the assemble editing system according to one embodiment of the present invention;

DETAILED DESCRIPTION OF THE PREFERRED EMBODIMENTS

A home video tape recorder is recently commercially available which is provided with two rotary sub-heads for special playback modes such as slow and still as well as two main recording/playback rotary heads. The assemble editing system of this invention will be described hereinafter with reference to embodiments using such a video tape recorder as described above. In the embodiments of this invention, as will become evident from the following description, one of the two special playback sub-heads is effectively used for assemble editing. Only one additional rotary head need be provided for assembly editing in addition to the two main recording/playback rotary heads.

Figure 1:
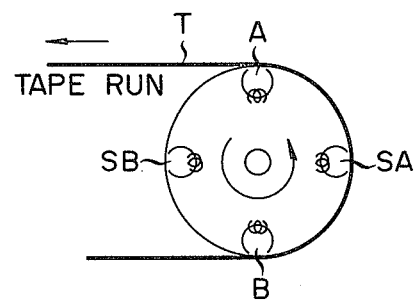
FIG. 1 is a view showing the positional relationship among rotary heads disposed on a rotary disc.

FIG. 1 shows the positional relationship of four heads disposed on a rotary disc. Reference symbols A and B denote normal recording/playback main heads; and SA and SB denote special playback sub-heads. Main heads A and B and sub-heads SA and SB are arranged in a normal relation with respect to each other. Reference symbol T denotes a video tape which runs in the direction indicated by an arrow in the recording/playback mode. The rotary disc rotates in the direction indicated by an arrow.

Figure 2A:
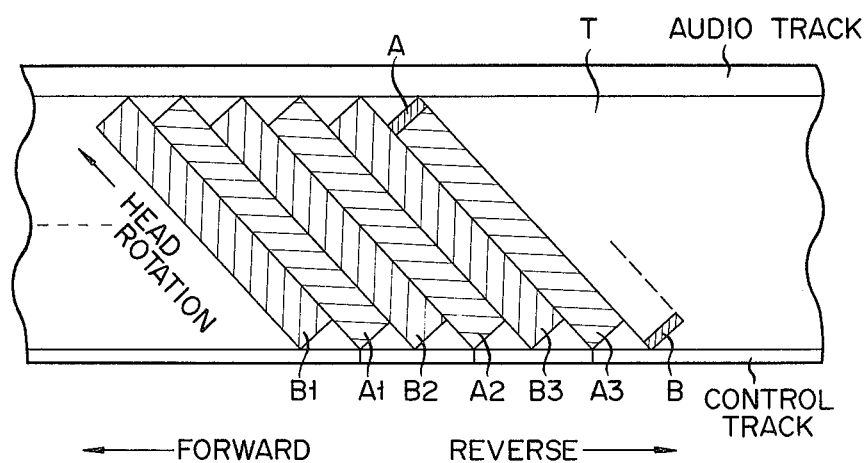
FIGS. 2A and 2B show recording patterns on a magnetic tape for explaining the outline of an assemble editing system according to the present invention.

The outline of the assemble editing system of the present invention will be described with reference to magnetic recording patterns shown in FIGS. 2A and 2B. For the assemble editing, it is only required that a recording pause operation be specified and then released.

When the recording pause operation is performed, a recording mute state is initiated at the time of completion of a video recording by main head A. Referring to FIG. 2A, skewed video tracks B1, A1, B2, A2, B3 and A3 indicate a previous recording pattern; the skewed video tracks B1, B2 and B3 are formed by main head B, and the skewed video tracks A1, A2 and A3 are formed by main head A. Each skewed video track corresponds to each field of video signal. The video track A3 is the final video track of the previous recording pattern. At the time of completion of the formation of track A3, main heads A and B take positions as shown in FIG. 2A. The positions of main heads A and B of FIG. 2A correspond to their positions relative to magnetic tape T shown in FIG. 1.

After video track A3 has been formed, magnetic tape T is rewound for a given time interval. The rewinding amount of magnetic tape T is set slightly greater than the running amount of tape from a time at which magnetic tape T starts to run in the forward direction due to the release of recording pause operation to a time at which the capstan servo system becomes stabilized.

After the recording pause operation is released, the magnetic tape T starts to run in the forward direction. At a time when main heads A and B trace video tracks A1 and B1, respectively, the capstan servo system is stabilized, and a head switching pulse obtained by rotation of the rotary disc and a control pulse reproduced from a control track of magnetic tape T have a predetermined phase relation therebetween. Under this condition, proper recording of new video signals is possible.

However, since the recording mute state is maintained at this time, a new video recording may not be performed. The sub-head SA is used as a means for detecting the recording start position for a new recording pattern and is in the playback mode for assemble editing.

Figure 2B:
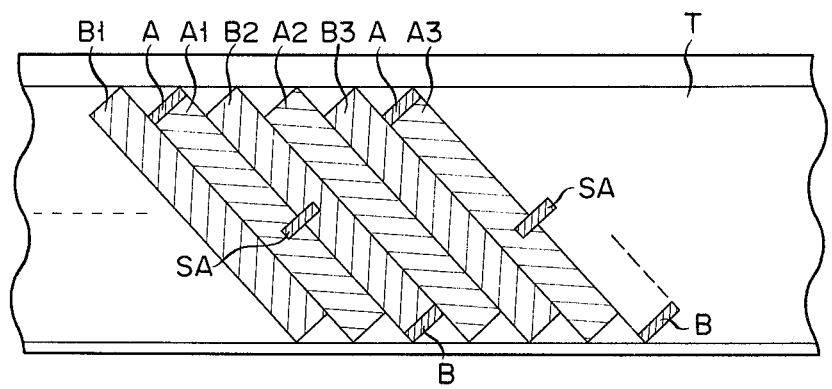

When main head A traces video track A1 of the previous recording pattern while magnetic tape T runs in the forward direction, the sub-head SA traces both of the video tracks A1 and B2, as shown in FIG. 2B. Therefore, an output signal reproduced by sub-head SA has a large signal level. When main head A traces final video track A3 of the previous recording pattern, the level of the output signal of sub-head SA is considerably lowered since no video track is formed adjacent to final track A3. Thus, the end of the previous recording pattern is detected, and the recording mute state is released so that a new video track is formed by main head B adjacent to video track A3.

Namely, according to the assemble editing system of the present invention, since the final video track of the previous recording pattern is detected, in other words, the start position of the new recording pattern is detected, the new recording pattern is formed adjacent to the previous recording pattern without a blank or overlapping portion therebetween. The sub-head SA used for assemble editing may not necessarily be disposed at an interval of 90° with respect to each of main heads A and B.

An embodiment of the assemble editing system of the present invention will be described with reference to FIG. 3.

A video signal is applied to main heads A and B of a rotary head assembly 10 through a recording mute circuit 11 and a recording amplifier 12 to which a power supply voltage REC+V is applied in the recording mode. Main heads A and B are connected to playback preamplifiers 13 and 14, respectively, while sub-heads SA and SB are connected to playback preamplifiers 15 and 16, respectively. In the playback mode, a power supply voltage PB+V is applied to playback preamplifiers 13 to 16 so as to be enabled to amplify an input signal. In the assemble editing mode, playback preamplifiers 13 to 16 are supplied with a power supply voltage AE+V from a time that the recording pause operation is released to a time that recording is restarted.

The outputs of playback preamplifiers 13 and 14 are coupled to one of inputs of a head change switch 21 through head change-over switches 19 and 20. The outputs of playback preamplifiers 15 and 16 are coupled to the other input of head change switch 21 through head change-over switches 19 and 20. The output of head change switch 21 is coupled to an FM demodulator 22 to which the power supply voltage PB+V or AE+V is supplied like playback preamplifiers 13 to 16. One pair of switches 17 and 18 and the other pair of switches 19 and 20 are alternately turned on/off in response to a 30-Hz head switching pulse from a head switching pulse generator 23. Switch 21 is controlled by a head change pulse from a head change pulse generator 26. In the normal recording/playback mode, switch 21 supplies, to FM demodulator 22, the output signals of playback preamplifiers 13 and 14 connected to main heads A and B. However, in the special playback mode or assembly editing mode from the time when the recording pause state is released to the time when recording is restarted, the output signals of playback preamplifiers 15 and 16 connected to sub-heads SA and SB are applied to FM demodulator 22.

Stationary pickup heads PG1 and PG2 are associated with rotary head assembly 10. Outputs of stationary pickup heads PG1 and PG2 drive head switching pulse generator 23 to generate the head switching pulse. Head switching pulse generator 23 supplied with the head change signal provides a main head switching pulse when the change signal specifies main heads A and B, and a sub-head switching pulse when the change signal specifies sub-heads SA and SB.

A recording pause signal generator 24 is provided which is actuated by an operator to generate a recording pause signal. The output of recording pause signal generator 24 is coupled to the set input S of a flip-flop circuit 25 for generating a recording mute signal REC.-MUTE in the assemble editing mode, head change signal generator 26, a power supply circuit 27 for generating the power supply voltage AE+V to enable playback preamplifiers 13 to 16 in the assemble editing mode, a playback mute circuit 28 for generating a playback mute signal PB.MUTE, a reel/capstan control circuit 29 for generating a control signal RV to rewind the magnetic tape for a given interval and a control signal FW to run the magnetic tape in the forward direction, and a capstan servo switching circuit 30 for switching the capstan servo system between the recording mode and the playback mode.

An output signal of head change switch 21 is supplied to an envelope detector 31, an output signal of which is then detected by a level detector 32. The output of level detector 32 is supplied to an input D of a D flip-flop circuit 33. The output pulse of head switching pulse generator 23 is supplied to a clock input terminal CP of flip-flop circuit 25 and to a monostable multivibrator 34 and to a slow/still control pulse generator 36. The output of monostable multivibrator 34 drives a monostable multivibrator 35, the output of which is coupled to a clock input CP of D flip-flop circuit 33. The D flip-flop circuit 33 has a DISABLE terminal to which the output of playback mute circuit 28 is coupled. D flip-flop circuit 33 forms a recording mute reset signal, and an output Q thereof is coupled to a reset input R of flip-flop circuit 25. The output Q of flip-flop circuit 33 is also coupled to head change signal generator 26, power supply circuit 27 and capstan servo switching circuit 30.

The playback mute signal PB.MUTE is generated for a given time interval until the capstan servo system is stabilized after the recording pause state is released. The playback mute signal PB.MUTE causes the output Q of flip-flop circuit 33 to go high, so that sub-head output level detection is neglected for the given time interval. After the given time interval has elapsed, the output level of the sub-head is lowered, so that the output Q of flip-flop circuit 33 goes low. As a result, head change pulse generator 26 specifies main heads A and B, so that head switching pulse generator 23 provides the main head switching pulse. The output Q of flip-flop circuit 25 goes low, so that the recording mute state is released. Therefore, new video track is formed by head B adjacent to final video track A3 of the previous recording pattern.

A control pulse CTLP reproduced from the control track of magnetic tape T by means of a control head CTL is applied to one of inputs of a switch 37 which is controlled by capstan servo switching circuit 30. An output pulse FGP from a head FG which detects the rotation of a capstan is applied to the other input of switch 37 and to an AFC circuit 38. An output of switch 37 is applied to an APC circuit 39. Outputs of AFC circuit 38 and APC circuit 39 are combined by an adder 40 and then applied to one of inputs of a switch 41. The output of slow/still pulse generator 36 is applied to the other input of switch 41. A capstan motor 42 is controlled by the output of switch 41. Capstan motor 42 has its rotating direction controlled by a control circuit 43 which receives the forward signal FW or the reverse signal RV from reel/capstan control circuit 29. Switch 37 supplies the pulse FGP to APC circuit 39 in the recording mode, while it supplies the pulse CTLP thereto in the playback mode. Switch 41 is changed over by a slow/still control pulse generator 44 which is actuated by operator. In the slow/still playback mode, capstan motor 42 is controlled by slow/still pulse generator 36. In the normal recording/playback mode, the capstan motor 42 is controlled by AFC circuit 38 and APC circuit 39. The output of slow/still control signal generator 44 is also coupled to head change signal generator 26. When a slow/still playback mode is designated, slow/still control signal generator 44 generates a signal to select sub-heads SA and SB. A reel motor 45 has its rotating direction controlled by a control circuit 46 supplied with the forward signal FW or the reverse signal RV from reel/capstan control circuit 29.

Figure 4:
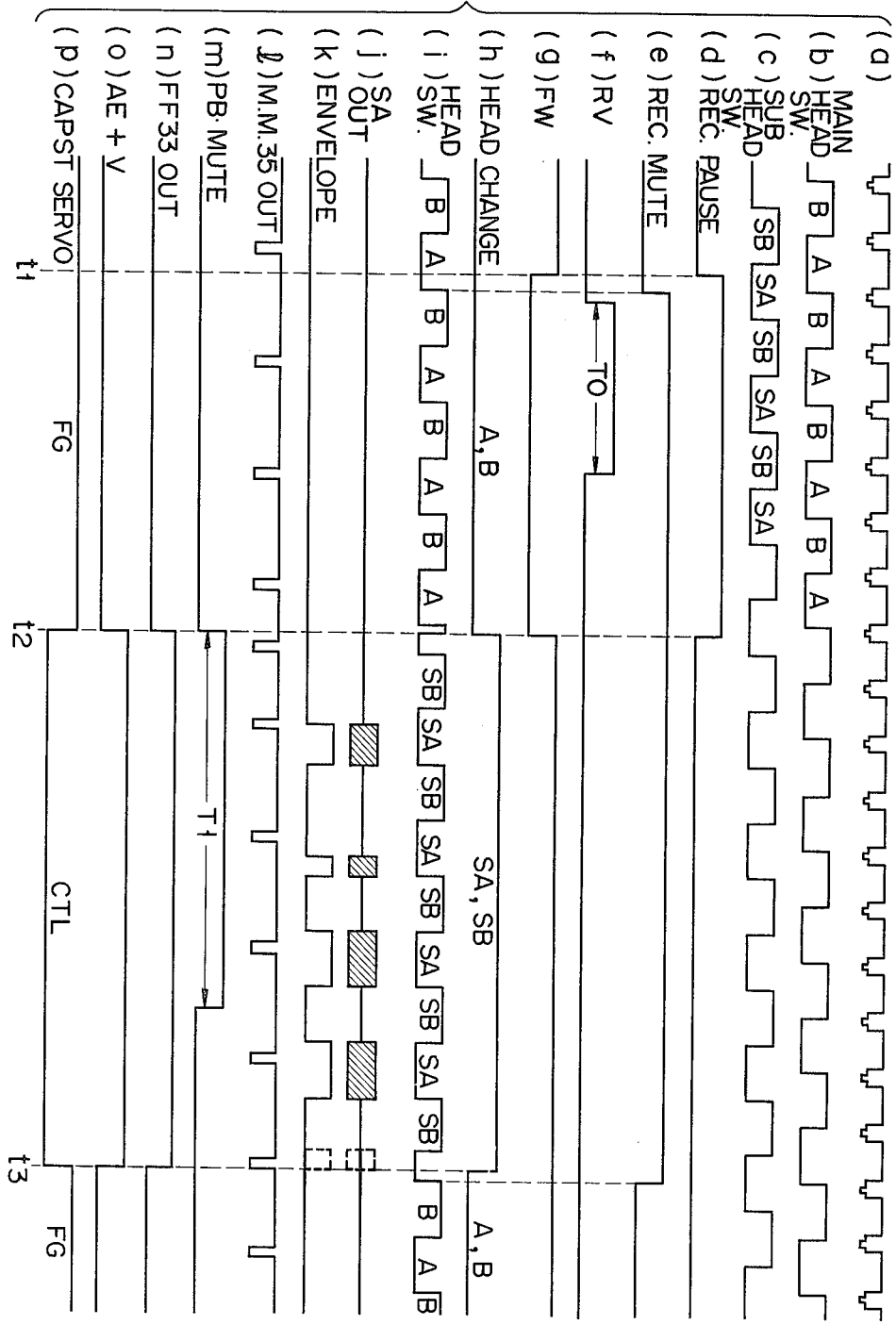
FIG. 4 is a timing diagram for explaining the operation of the assemble editing system of FIG. 3.

The operation of the assemble editing system shown in FIG. 3 will be described with reference to timing diagram of FIG. 4. FIG. 4(a) shows a video signal including a vertical sync signal VS; FIG. 4(b) shows a switching pulse for main heads A and B which is generated by head switching pulse generator 23; and FIG. 4(c) shows a switching pulse for sub-heads SA and SB. In the assemble editing mode, a switching pulse shown in FIG. 4(i) is provided by head switching pulse generator 23. When the main head switching pulse is high, switch 18 coupled to main head B is turned on, while, when the main head switching pulse is low, switch 17 coupled to main head A is turned on. When the sub-head switching pulse is high, switch 20 coupled to sub-head SB is turned on, while, when the sub-head switching pulse is low, switch 19 coupled to sub-head SA is turned on.

When recording pause circuit 24 is actuated at time t1, the REC.PAUSE signal goes high. As a result, the output Q of flip-flop circuit 25 goes high in synchronism with the rising edge of the main head switching pulse provided by head switching pulse generator 23 to enable recording mute circuit 11. It is noted that the recording mute is initiated when a video recording is completed by main head A. A little after the recording pause operation is initiated, reel/capstan control circuit 29 produces the tape rewind signal RV for a given time interval as shown in FIG. 4(f) so that reel motor 45 and capstan motor 42 are backward rotated to rewind magnetic tape by a given amount.

At time t2, the recording pause operation is released so that the REC.PAUSE signal goes low. In response to this reel/capstan control circuit 29 produces the tape forward drive signal FW, as shown in FIG. 4(g), so that capstan motor 42 and reel motor 45 are forward rotated to run the magnetic tape T in the forward direction. Simultaneously, the output of head change signal generator 26 goes high as shown in FIG. 4(h) so that head change switch 21 is switched to the sub-heads and head switching pulse generator 23 provides the sub-head switching pulse as shown in FIG. 4(i). In response to the fall of the REC.PAUSE signal, the output of playback mute circuit 28 goes high as shown in FIG. 4(m) for a given time interval T1 until the capstan servo system is stabilized in order to prevent an erroneous operation. As a result, D flip-flop circuit 33 is disabled so that its output Q forcedly goes high. This is intended to cause the D flip-flop circuit 33 not to respond to the detection result of the output level of sub-head SA until the capstan servo system is stabilized. In response to the falling edge of the REC.PAUSE signal, power supply circuit 27 is driven to supply the power supply voltage AE+V, as shown in FIG. 4(o), to playback preamplifiers 13 to 16. Thus, the reproduction of the previous recording pattern is made possible. Simultaneously, capstan servo switching circuit 30 switches switch 37 to apply the control pulse CTLP reproduced by control head CTL to APC circuit 39 as shown in FIG. 4(p). Namely, the capstan servo system is controlled in the playback mode. FIG. 4(j) shows the reproduced output signal of sub-head SA in the playback mode after the recording pause operation is released. This output signal is applied to envelope detector 31 so that its envelope is detected as shown in FIG. 4(k). The output pulse of head switching pulse generator 23 is applied to negative-edge triggered monostable multivibrator 34 which in turn drives negative-edge triggered monostable multivibrator 35 to produce an output signal as shown in FIG. 4(l). The time constants of monostable multivibrators 34 and 35 are selected such that each of negative-going output pulses of multivibrator 35 is produced when the output pulse of head switching pulse generator 23 is low.

D flip-flop circuit 33 transmits a voltage level at its input D to its output Q in response to the positive edge of the output pulse of monostable multivibrator 35. However, during a given time interval T1 after the recording pause operation is released, that is, when the capstan servo system in the playback mode is regarded as unstable, D flip-flop circuit 33 is disabled so that its output Q remains high. This means that the detection of reproduced output signal of sub-head SA is neglected. After the given time interval T1 has elapsed, when sub-head SA traces the previous recording pattern the reproduced output signal is obtained from sub-head SA, as shown in FIG. 4(j), during the low state period of the head switching pulse. Therefore, a relatively high level envelope output is produced by envelope detector 31. This envelope output is detected by level detector 32. Since the output of level detector 32 is positive at the positive edge of the output of monostable multivibrator 35, the output Q of D flip-flop circuit 33 remains high, as shown in FIG. 4(n). As shown in FIG. 2B, when sub-head SA traces final video track A3 of the previous recording pattern, the output level of sub-head SA is lowered so that the output of level detector 32 goes low. The output Q of D flip-flop circuit 33 goes low at time t3 in response to the positive edge of the output pulse of monostable multivibrator 35. Thus, the output of head change signal generator 26 goes low as shown in FIG. 4(h) so that head change switch 21 selects main heads A and B, and head switching pulse generator 23 provides the main head switching pulse as shown in FIG. 4(i). Immediately thereafter, in response to the rising edge of the main head switching pulse, the output Q of flip-flop circuit 25, in other words, the REC.-MUTE signal goes low to restart video recording. It is noted that since video recording is restarted in synchronism with the rising edge of the main head switching pulse, a new video track is formed by main head B adjacent to final video track A3 of the previous recording pattern.

In response to the falling edge of output Q of D flip-flop circuit 33, the power supply voltage AE+V goes low as shown in FIG. 4(o), and capstan motor 42 is controlled by the pulse FGP as shown in FIG. 4(p).

Figure 5:
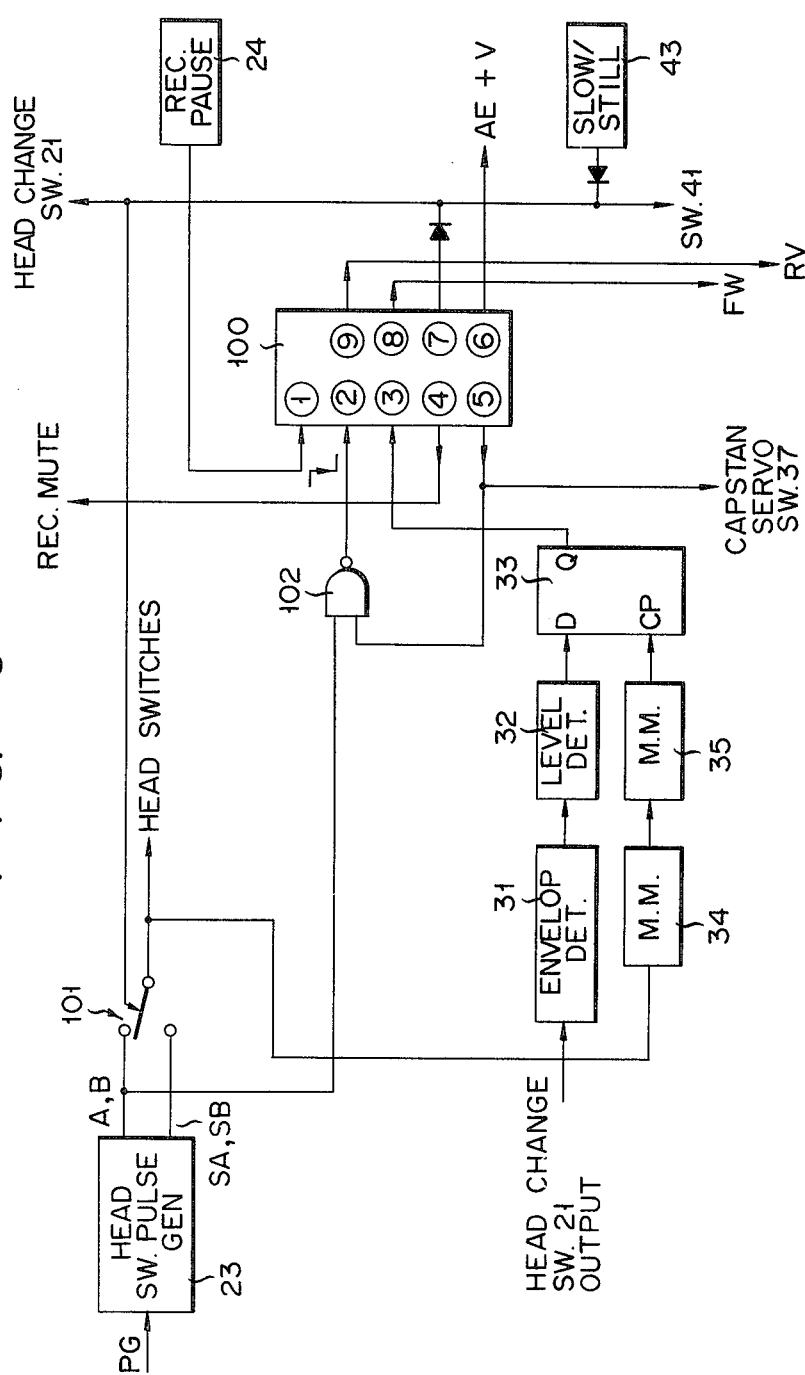
FIG. 5 is a block diagram showing main part of an assemble editing system using a microcomputer according to another embodiment of the present invention.

The assemble editing system of this invention can also be implemented by means of a microcomputer system. FIG. 5 shows the assemble editing system using a 4-bit 1-chip microcomputer (Toshiba: TMP4315). In FIG. 5, the same reference numerals are used to denote the same parts as those in FIG. 3, and a detailed description thereof will be omitted.

Referring to FIG. 5, reference numeral 100 denotes the 4-bit 1-chip microcomputer which has terminals ① to ⑨. The terminals ①, ② and ③ are input ports, while terminals ④ to ⑨ are output ports. Recording pause signal generator 24 is connected to terminal ① to which a high level voltage is applied in response to a recording pause operation, and to which a low level voltage is applied when the recording pause operation is released. An input pulse is applied to terminal ② so that its falling edge is detected. The output Q of flip-flop circuit 33 is connected to terminal ③. When the start position of a new recording pattern is detected during the playback mode for assemble editing, the input level becomes low. During the playback mode, the output level of D flip-flop circuit 33 is neglected in microcomputer 100 for the given time interval T1 during which the capstan servo system should be stabilized. Terminal ④ is connected to recording mute circuit 11. When the output level of terminal ④ is high, the recording mute operation is performed, while, when it is low recording is enabled. Terminal ⑤ provides an output to switch the capstan servo system between the playback and recording modes. When the output level of terminal ⑤ is high, capstan motor 42 is controlled in the recording mode using the FG pulse. On the other hand, when it is low, capstan motor 42 is controlled in the playback mode using the CTL pulse. Terminal ⑥ provides the power supply voltage AE+V (high level) to enable preamplifiers 13 to 16. Terminal ⑦ produces the head change signal. When the output level of terminal ⑦ is high, sub-heads SA and SB are specified. When it is low, main heads A and B are specified. Terminal ⑧ produces the signal FW of a high level to forward-rotates the reel and capstan motors. Terminal ⑨ provides the signal RV of a high level to reverse-rotates the reel and capstan motors.

A switch 101 is switched by the output of slow/still control pulse generator 44 or terminal ⑦ of microcomputer 100 to select the main head switching pulse (A, B) or the sub-head switching pulse (SA, SB) provided by head switching pulse generator 23.

The main head switching pulse from head switching pulse generator 23 is supplied to one input of a NAND gate 102. The other input of NAND gate 102 is connected to terminal ⑤ of microcomputer 100. The output NAND gate 102 is connected to terminal ② of microcomputer 100 which detects the falling edge of input pulses. NAND gate 102 is provided to invert the main head switching pulse in the recording mode and to make the switching timing from main head A to main head B at the beginning and end of the recording mute operation coincide with the falling edge of the inverted main head switching pulse.

Figure 6:
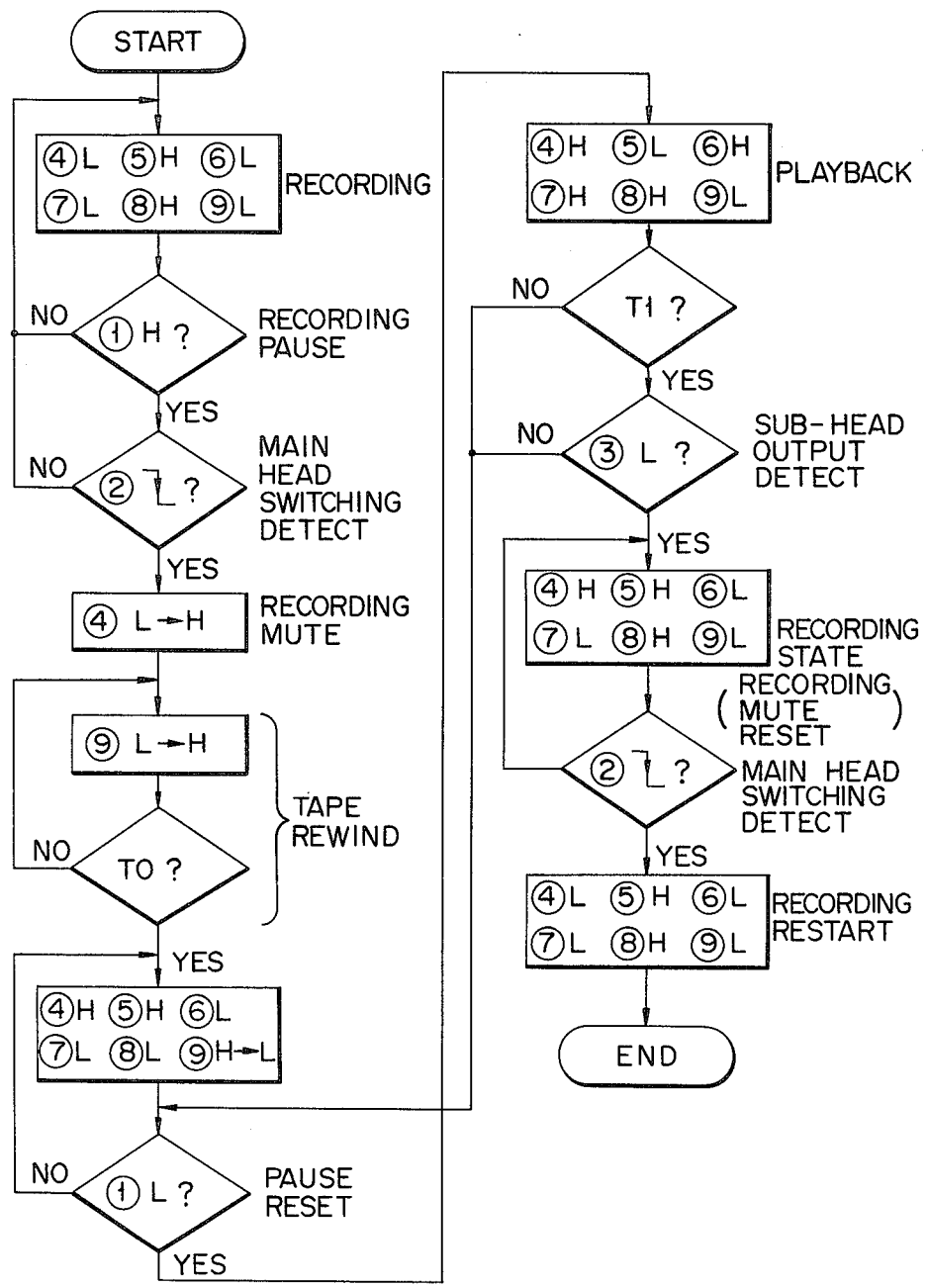
FIG. 6 is a flowchart for explaining the operation of the assemble editing system of FIG. 5.

The operation of the assemble editing system with microcomputer 100 will be described with reference to a flowchart in FIG. 6.

A recording operation is performed by a START operation. In the recording mode, terminal ④ is set to low level, terminal ⑤ is high, terminal ⑥ is low, terminal ⑦ is low, terminal ⑧ is high, and terminal ⑨ is low. Namely, the recording mute operation is released, the capstan servo system is operated in the recording mode, and the playback preamplifiers are disabled. Further, the main head switching pulse is supplied to the head switcher and the reel and capstan motors forward-rotates.

In the next step, it is examined whether the input level of terminal ① is high. If not high, recording operation continues. However, if terminal ① is set high, that is, if the recording pause operation is performed, the falling edge of the output pulse of NAND gate 102 is detected. The above operation is maintained until the falling edge, that is, the timing at which a recording by main head A is completed, is detected. When the falling edge is detected, terminal ④ goes from low level to high level, so that recording mute is started.

After the recording mute operation has been initiated, terminal ⑨ goes from low level to high level, so that the reel and capstan motors are reverse-driven for the given time interval T0. Thus, the magnetic tape T is rewound. Terminal ⑨ then goes from high level to low level to interrupt rotat of the reel and capstan motors. Next, it is examined whether terminal ① is set low, that is, whether the recording pause mode released. If the recording pause operation is released, then the operation proceeds to the playback mode for assemble editing. In this playback mode, the voltage level of terminal ⑤ goes low, terminal ⑥ goes high, terminal ⑦ goes high, and terminal ⑧ goes high. The capstan servo system is operates in the playback mode, the preamplifiers are enabled, and head switches are operated by the sub-head switching pulse, and the reel and capstan motors are forward-driven. Next it is examined whether this operation has continued for the given time interval T1 until the control pulse CTLP and the head switching pulse are phased. If the given time interval T1 has elapsed, the output level of D flip-flop circuit 33 connected to terminal ③ is discriminated as the next step. As described in the first embodiment, when main head A traces final video track A3 of the previous recording pattern, the input level of terminal ③ is low. If the input level of terminal ③ is low the operation proceeds to recording state. Namely, the voltage level of terminal ⑤ goes high, terminal ⑥ goes low, and terminal ⑦ goes low so that, the capstan servo system is operated in the recording mode, the preamplifiers are disabled, and the head switches are switched by the main head switching pulse while the recording mute is sustained.

Subsequently, the falling edge of the output pulse of NAND gate 102 is detected. When the falling edge, that is, the timing of completion of tracing final video track of the previous recording pattern by main head A is detected recording is restarted. Namely, the output level of terminal ④ goes low so that the recording mute is released and a new video track is formed by main head B adjacent to the final video track of the previous recording pattern. Thus, the operation of assemble editing is completed.

What is claimed is:

1. An assemble editing system for a video tape recorder which has first and second video heads disposed on a rotary disc at an interval of 180° for sequentially recording a video signal for each field as a single skewed video track on a magnetic tape and for sequentially reproducing therefrom the video signal for each field, comprising:

a sub-head disposed on said rotary disc at predetermined intervals with respect to said first and second rotary video heads;

recording pause means responsive to a recording pause operation given by an operator during a recording mode for generating a recording pause signal until the recording pause operation is released;

recording mute means responsive to the recording pause signal for interrupting the supply of the video signal to said first and second video heads at a timing that a video recording by said first video head is completed;

means for rewinding the magnetic tape for a given time interval in response to the recording pause signal;

means for running the magnetic tape in the forward direction in response to a recording pause release operation given after the magnetic tape has been rewound for the given time interval;

final track detecting means for detecting, after the start of running of the magnetic tape in the forward direction, the final track of a previous recording pattern that is recorded on the magnetic tape by said first video head in accordance with the level of a reproduced output signal of said sub-head which traces video tracks recorded during the recording mode; and recording mute releasing means responsive to detection of the final track of the previous recording pattern for causing said recording mute means to restart the supply of video signal to said first and second video heads at a timing that a new video track is started to be recorded by said second video head which is adjacent to the final video track recorded by said first video head.

2. A system according to claim 1, wherein said sub-head is disposed on said rotary disc at an interval of 90° with respect to each of said first and second video heads.

3. A system according to claim 1 or 2, wherein said sub-head is one of two special playback video heads disposed on said rotary disc.

4. A system according to claim 1, further comprising means for allowing said final track detecting means to neglect the level of the reproduced output signal of said sub-head for a predetermined interval after the magnetic tape begins to run in the forward direction.

5. An assemble editing method for a video tape recorder which comprises first and second video heads disposed on a rotary disc at an interval of 180° for sequentially recording a video signal for each field as a single skewed video track on a magnetic tape and for sequentially reproducing therefrom the video signal for each field, and a sub-head disposed on said rotary disc at predetermined intervals with respect to said first and second video heads, comprising the steps of:

operating said video tape recorder in a recording mode to sequentially record video tracks on the magnetic tape by said first and second video heads;

performing a recording pause operation;

interrupting the supply of the video signal to said first and second video heads at a timing that said first video head completes to record a video track after the recording pause operation;

rewinding the magnetic tape for a given time interval after the supply of the video signal to said first and second video heads is interrupted;

running the magnetic tape in the forward direction by releasing the recording pause operation after the magnetic tape has been rewound for the given time interval;

detecting the level of an output signal of said sub-head tracing the video tracks recorded by said first and second video heads in the first step after the magnetic tape is started to run in the forward direction; and restarting, in response to the reduction of the level of the output signal of said sub-head, the supply of the video signal to said first and second video heads at a timing that said first video head completes to trace the final video track recorded by said first video head in the first step.

* * * * *